United States Patent
Minarik

(10) Patent No.: US 8,136,041 B2
(45) Date of Patent: Mar. 13, 2012

(54) SYSTEMS AND METHODS FOR PLAYING A MUSICAL COMPOSITION IN AN AUDIBLE AND VISUAL MANNER

(76) Inventor: Bernard Minarik, Quakertown, NJ (US)

( * ) Notice: Subject to any disclaimer, the term of this patent is extended or adjusted under 35 U.S.C. 154(b) by 1083 days.

(21) Appl. No.: 11/963,800

(22) Filed: Dec. 22, 2007

(65) Prior Publication Data
US 2008/0307948 A1     Dec. 18, 2008

(51) Int. Cl.
G06F 3/00 (2006.01)
(52) U.S. Cl. .............. 715/716; 715/727; 715/756
(58) Field of Classification Search .............. 715/744, 715/757, 782; 84/812
See application file for complete search history.

(56) References Cited

U.S. PATENT DOCUMENTS

| | | | |
|---|---|---|---|
| 2,913,954 A * | 11/1959 | Morgan | 352/2 |
| 3,473,428 A * | 10/1969 | Phillips | 84/464 R |
| 3,751,150 A | 8/1973 | Roberts | |
| 4,089,598 A * | 5/1978 | Meyer et al. | 353/17 |
| 5,286,908 A | 2/1994 | Jungleib | |
| 5,508,470 A | 4/1996 | Tajima et al. | |
| 5,557,424 A | 9/1996 | Panizza | |
| 5,915,288 A * | 6/1999 | Gabriel | 84/609 |
| 6,140,565 A | 10/2000 | Yamauchi et al. | |
| 6,395,969 B1 | 5/2002 | Fuhrer | |
| 6,646,644 B1 | 11/2003 | Suzuki et al. | |
| 6,845,073 B2 | 1/2005 | Yamada et al. | |
| 7,069,516 B2 * | 6/2006 | Rekimoto | 715/757 |
| 7,116,328 B2 | 10/2006 | Kawai et al. | |
| 2003/0148734 A1 | 8/2003 | Kim | |
| 2005/0088333 A1 * | 4/2005 | Allport | 341/176 |
| 2005/0190199 A1 | 9/2005 | Brown et al. | |
| 2005/0203849 A1 | 9/2005 | Benson | |
| 2006/0031770 A1 * | 2/2006 | McMenamin | 715/741 |

FOREIGN PATENT DOCUMENTS
JP     2005-122664 A     5/2005
(Continued)

OTHER PUBLICATIONS

WWW.YOUTUBE.COM, *Paul Whiteman—Whispering* (1920) *Phonograph* (Nov. 17, 2007) printed on Feb. 12, 2010 from http://www.youtube.com/watch?v=g6tZoJzo_hk&feature=related, 2 pages.

Byun, Sung Cheal, Korean Intellectual Property Office International Searching Authority, Patent Cooperation Treaty Search Report and Written Opinion for PCT/US2008/086592, 7 pages.

*Primary Examiner* — Tuyetlien Tran
*Assistant Examiner* — Truc Chuong
(74) *Attorney, Agent, or Firm* — Chipperson Law Group

(57) ABSTRACT

Disclosed are systems and methods for playing a musical composition in an audible and visual manner. In one aspect, a visual representation of a phonograph playing an analog record is transmitted to a viewer/listener along with the actual analog audio generated by same. Such transmission may occur via television networks, the Internet, or other similar networks. In another aspect, such visual representations are played with digitally recorded audio in a time-correlated manner. In yet another aspect, such visual representations are recorded with digital audio in a soft format such as a digital file, MP3 file, or the like for use with portable audio and visual devices, for streaming via the Internet, for use in gaming, and/or for use as software. Such visual representations may also be displayed at live events such that the timing of the video play and the performance of the live or recorded audio is correlated.

21 Claims, 5 Drawing Sheets

FOREIGN PATENT DOCUMENTS

| | | |
|---|---|---|
| KR | 0670443 B1 | 1/2007 |
| KR | 10-2007-0040988 A | 4/2007 |
| WO | WO 01/65526 A1 | 9/2001 |
| WO | WO 2005/024796 A3 | 3/2005 |

* cited by examiner

SYSTEMS AND METHODS FOR PLAYING A MUSICAL COMPOSITION IN AN AUDIBLE AND VISUAL MANNER

BACKGROUND OF THE INVENTION

Embodiments of the present invention generally relate to systems and methods for playing music compositions in an audible and visual manner. More specifically, the present invention relates to systems and methods for playing music compositions in an audible and visual manner via displaying an original vinyl record (or other analog music recording), or the playing thereof, and/or creating audio therefrom.

Systems and methods for playing digitally-recorded music while providing a visual representation are known in the art. Some such systems and methods include the playing of digitally-recorded music via television. When a listener tunes in to the desired television channel, the listener may listen to the digitally-recorded music provided therewith through the television's audio equipment. Typically, a visual display is provided on the television screen during playing of the digitally-recorded music. For example, the screen may be a blue or black screen having textual information in a corner thereof which may include information such as the title, artist, and album associated with the played song. In some instances, the visual representation may include a picture of the artist or the album upon which the digitally-recorded music was originally recorded.

Similarly, systems and methods for playing digitally-recorded music via a computer while providing a visual representation are also known. Such systems and methods typically include the provision of an artistic graphical display that may move to the beat of the digitally-recorded music being played. Some such graphical displays are unrelated to the digitally-recorded music being played. Other such displays may be related to the music being played including videos of the musicians, filmed storylines (e.g., music videos), and the like. Or, in other computer embodiments, digitally-recorded music has no visual accompaniment other than a text name of an audio file stored on a folder of the computer system.

BRIEF SUMMARY OF THE INVENTION

Briefly stated, in one aspect of the present invention, a method of playing at least one musical composition in an audible and visual manner is provided. This method includes the steps of: generating an audible representation of at least one music composition; and generating a visual representation of the at least one music composition, the visual representation including at least one image of a record being played via a phonograph, wherein a first timing of the visual representation substantially matches a second timing of the audible representation.

In another aspect of the present invention, a system for playing at least one musical composition in an audible and visual manner is provided. This system includes: a phonograph; at least one record played via the phonograph, the playing creating audio; at least one video device for recording video, said at least one video device positioned to include a plurality of images of at least a portion of the phonograph; an audio/visual converter directly or indirectly coupled to the phonograph and the at least one video device, the audio/visual converter receiving the audio from the phonograph, and the audio/visual converter receiving the video from the at least one video device; a signal distributor coupled directly or indirectly to the audio/visual converter, the signal distributor receiving the audio and the video from the audio/visual converter; and at least one end device coupled directly or indirectly to the signal distributor, the at least one end device receiving the audio and the video from the signal distributor.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
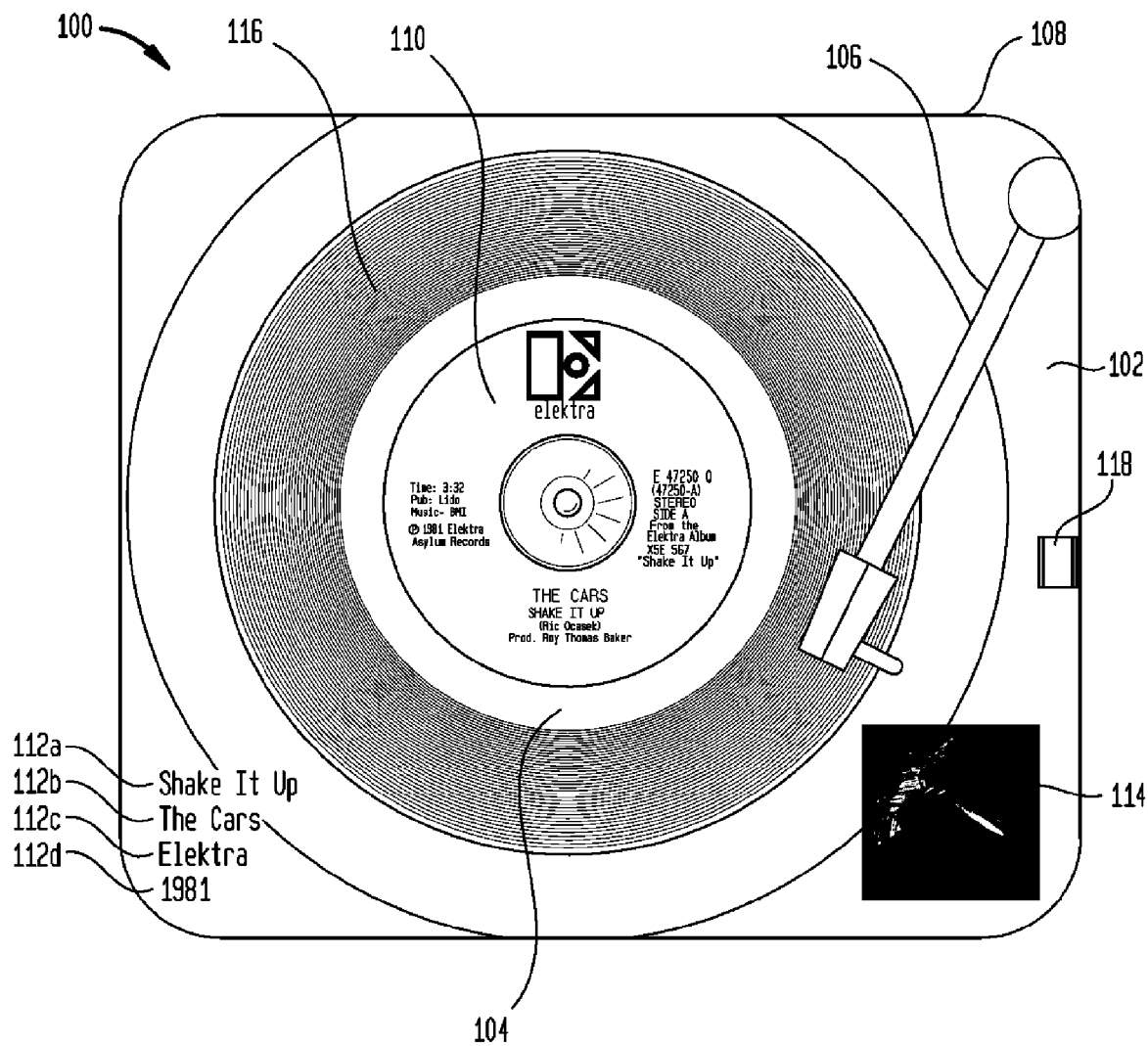
FIG. 1 depicts an exemplary visual representation of a musical composition in accordance with one embodiment of the present invention including an overhead view of a record being played via a phonograph.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventor also contemplates aspects of the invention described by the plural of that term. As used in this specification and in the appended claims, the singular forms "a", "an" and "the" include plural references unless the context clearly dictates otherwise, e.g., "a record" includes a plurality of records and "a musical composition" includes a plurality of musical compositions. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. Any publications mentioned herein are incorporated herein by reference in their entirety. Where there are discrepancies in terms and definitions used in references that are incorporated by reference, the terms used in this application shall have the definitions given herein.

Figure 2:
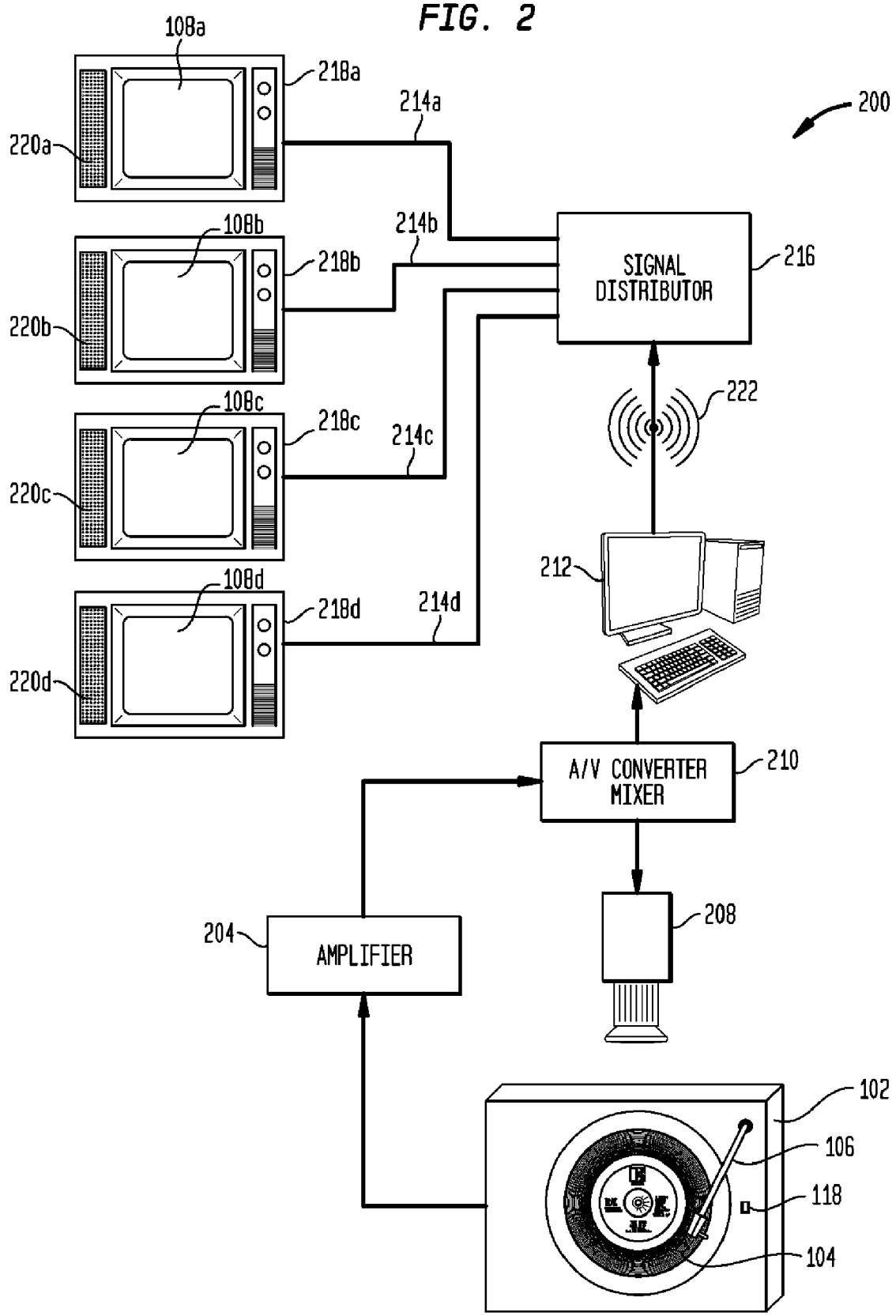
FIG. 2 is a schematic of an exemplary system for transmitting a visual representation, such as the exemplary visual representation in FIG. 1, to a viewer/listener in accordance with one embodiment of the present invention.
Figure 3:
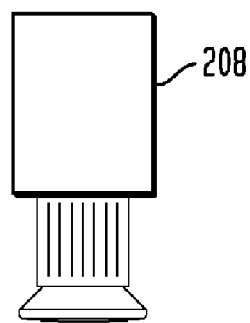
FIG. 3 depicts a side view of an exemplary configuration of a record player and an overhead camera of the exemplary system depicted in FIG. 2.
Figure 3:
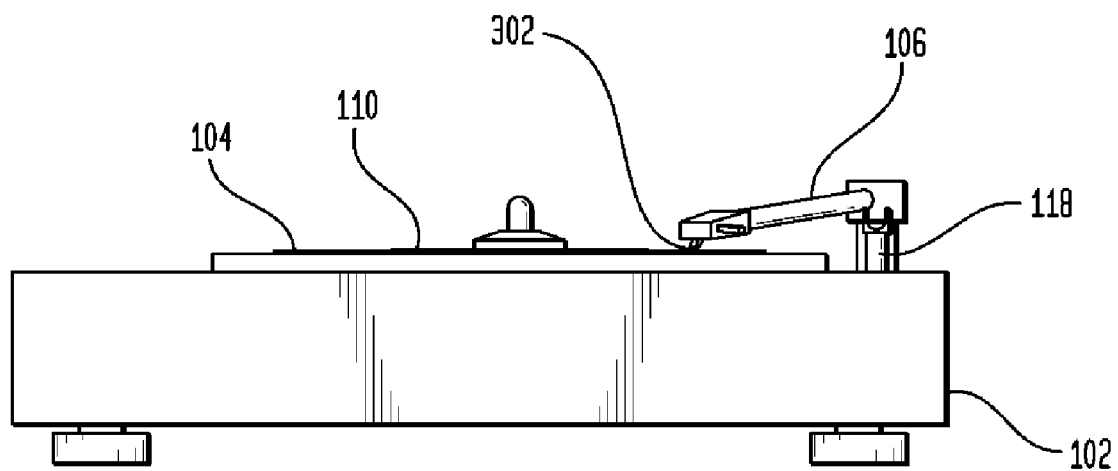

Referring first to FIG. 1, depicted is visual representation 100 in accordance with one embodiment of the present invention. This visual representation may be produced by exemplary system 200 as illustrated in FIG. 2 and the exemplary phonograph/camera configuration illustrated in FIG. 3, however, the invention is not so limited. In one aspect of the present invention, visual representation 100 includes, inter alia, a depiction of phonograph 102, record 104, tonearm 106 (including stylus 302 as depicted in FIG. 3), musical composition information 112, image 114, and tonearm rest 118. In the depicted embodiment, visual representation 100 is depicted on screen 108 which may include, but is not limited to, a screen of a television, an iPod, a computer, a cell phone, and a personal digital assistant ("PDA").

In the embodiment depicted in FIG. 1, record 104 is depicted as being played by phonograph 102 as is known. That is, record 104 is depicted as rotating with respect to phonograph 102 as tonearm 106 of phonograph 102 holds a stylus, such as stylus 302 as depicted in FIG. 3, atop record 104 such that the musical composition recorded on record 104 is played. For example, record 104 may be a record created for play at 33⅓ revolutions per minute ("RPM") (a "33"), 45 RPM (a "45"), or 78 RPM (a "78"). In some embodiments of the present invention, visual representation 100 is a live or recorded video of record 104 being played by phonograph 102. In other embodiments of the present invention, visual representation 100 may be a digitally created image of record 104 being played by phonograph 102 (i.e., an image that does not include a physical record or phonograph but rather a depiction thereof). In some embodiments of the present invention, record 104 includes a minimal amount of aural imperfections that may add to, rather than detract from, the listening experience provided by the present invention.

Additionally, as depicted in FIG. 1, visual representation 100 includes musical composition information 112, which may include, but is not limited to, title 112a, artist 112b, recording label or publisher 112c, and year 112d. Other desirable information may include, but is not limited to, information appearing on the label of record 104, information appearing on the sleeve in which record 104 was originally distributed, and other musical composition-related information. However, a lesser or greater quantity of musical composition information 112 may be substituted without departing from the scope of the present invention. Or, alternatively, musical composition information 112 may be omitted or displayed periodically without departing from the scope hereof. Also, although musical composition information 112 is depicted in a textual format, some or all of such information may be alternatively depicted in a photographic format.

Similarly, as also depicted in FIG. 1, visual representation 100 includes image 114. Image 114 is depicted in FIG. 1 as an image of the sleeve in which record 104 was distributed, however, alternate images may be substituted without departing from the scope of the present invention including, but not limited to: an image of the artist; an image of the playing record 104 in a still position (e.g., to facilitate viewing thereof); for played 45 s, an image of the full album (e.g., the 33⅓ RPM album) in which the musical composition was included, if any; and/or advertising information for a paid sponsor. A greater quantity of images 114 may be substituted without departing from the scope of the present invention. Or, alternatively, image 114 may be omitted or displayed periodically without departing from the scope hereof. Also, although image 114 is depicted in a photographic format, some or all of such information may be alternatively depicted in a textual format.

Turning next to FIG. 2, depicted is exemplary system 200 for creating and transmitting a visual representation and accompanying audio of a musical composition to a viewer/listener in accordance with one embodiment of the present invention. In this embodiment, the visual representation is a live or recorded video of an actual, physical record 104 being played by an actual, physical phonograph 102. The accompanying audio is the actual audio generated by phonograph 102's playing of record 104. This visual representation and accompanying audio may be broadcast through cable television, satellite television, or other similar systems for receipt in a home, business, or other location. System 200 allows a viewer/listener to watch and listen to an actual record 104 playing via phonograph 102 in almost the same manner as if the viewer/listener were playing the actual record 104 on the viewer's own phonograph.

System 200 includes, inter alia, phonograph 102, amplifier 204, video device 208, audio/visual converter 210, editing device 212, signal distributor 216, and a plurality of end devices (i.e., televisions 218). System 200 includes many of the same components typically used to broadcast other forms of live entertainment via cable television, satellite television, and other similar systems, thereby allowing the systems and methods of the present invention to be implemented easily and at minimal cost.

Phonograph 102 may be virtually any conventional or commercially-available phonograph, turntable, record player, or the like such as, for example, a Technics SL-B300 Frequency Generator Servo Automatic Turntable System. In the embodiment of the present invention depicted in FIG. 2, phonograph 102 may be located in a broadcasting studio or the like and it includes, inter alia, tonearm 106, stylus 302 (FIG. 3), and an internal pickup. Stylus 302 (FIG. 3) is a slender rod or the like typically having a rounded tip that is used by phonograph 102 to transmit vibrations. Stylus 302 (FIG. 3) is held at a distal end of tonearm 106, which includes an integral pickup. The pickup converts the mechanical movement of stylus 302 into electrical impulses for the reproduction of audio. In this manner, and as known, record 104 is played via phonograph 102 by powering on phonograph 102, placing stylus 302 at the beginning, or outermost portion, of the playable portion of record 104, and rotating record 104 such that tonearm 106 and its stylus 302 move progressively inward along grooves 116 of record 104. Such rotation continues until the musical composition recorded on record 104 completes, at which point tonearm 106 moves toward the center of record 104. When tonearm 106 reaches its stop point on record 104, it is lifted from the record and returned to its resting position, typically atop a tonearm rest such as tonearm rest 118.

The video of the playing of record 104 by phonograph 102 is captured via video device 208, which may be virtually any conventional or commercially-available product capable of capturing and/or recording film and/or video of a live event such as a camera, video recorder, and the like, for example, a Sony DSR PD150 3-Chip Digital Camcorder.

A side view of an exemplary configuration of phonograph 102 and video device 208 is depicted in FIG. 3. Video device 208 is located directly overhead phonograph 102 upon which record 104 is played. As a phonograph operates optimally on a level surface, the depicted configuration of phonograph 102 and video device 208 allows an unobstructed, straight on view of record 104, its integral artwork (if any) 110 (FIG. 1), information regarding whether record 104 is playing (i.e., is record 104 rotating or still), information regarding the approximate length of time remaining for the musical composition as determined from the position of tonearm 106, information regarding the musical composition as determined from artwork 110 which may include, but is not limited to: the record label, artist, and/or artists responsible for producing the musical composition; the title of the musical composition; the year of creation of the musical composition; the writer(s), publisher(s), and/or producer(s) of the musical composition; an identification number such as a serial number; and any copyright statement(s).

In addition to providing a top view of the playing of a musical composition from start to end, this configuration also provides a top view of the completion of the playing of a musical composition and the subsequent movement of tonearm 106 toward the center of record 104. It further depicts the lifting of tonearm 106 from record 104 and its return to its resting position atop tonearm rest 118.

In addition, the configuration shown in FIG. 3 is optimal for allowing a viewer/listener to determine the approximate portion of the musical composition that has already played as well as the approximate portion of the musical composition that remains to be played. As record 104 is playing, tonearm 106 is located at a point on record 104 along the distance starting at the start point of the musical composition and ending at the end point thereof. The location of tonearm 106 along this distance is approximately equal to the portion of the musical composition that has already played. That is, if tonearm 106 is located at ¼ of this distance from the starting point of the musical composition, a viewer/listener may estimate that approximately ¼ of the musical composition has played and approximately ¼ of the musical composition remains to be played. Although the configuration shown in FIG. 3 is optimal for determining this type of information, such information may also be determined in varying configurations/views.

Furthermore, the configuration shown in FIG. 3 is optimal for allowing a viewer/listener to determine the location of a verse, chorus, or other portion of the musical composition. Such information may often be determined through viewing the visual variances of grooves 116 (FIG. 1), which often indicate items including, but not limited to, increased or decreased volume, heavy or light instrumentation, and song or record-related audio cues. Although the configuration shown in FIG. 3 is optimal for determining this type of information, such information may also be determined in varying configurations/views.

FIG. 3's configuration further provides an optimal view of the artwork or other printing included on the non-playable portion of record 104. Such information may include, but is not limited to, original record artwork, musical composition title, artist, recording company, recording company trademarks or logos, year, and copyright information. Again, although the configuration shown in FIG. 3 is optimal for determining this type of information, such information may also be determined in varying configurations/views. Although FIG. 3 depicts video device 208 in an overhead configuration relative to phonograph 102, other locations of video device 208 and/or other camera angles for video device 208 may be substituted without departing from the scope of the present invention.

Referring back to FIG. 2, once video of phonograph 102 and any associated records 104 is captured, it may be recorded by video device 208 and/or directly transferred to audio/visual converter 210 for mixing of such video with the audio received by audio/visual converter 210 from amplifier 204 as discussed in greater detail below.

In the embodiment of the present invention depicted in FIG. 2, the audio generated by phonograph 102 is captured by amplifier 204. Amplifier 204 may be virtually any conventional or commercially-available amplifier capable of receiving and amplifying audio such as, for example, a Technics FM/AM Stereo Receiver SA-300. Amplifier 204 processes the electrical impulses created by a pickup or the like, which is integral to tonearm 106, in order to allow such sound to be interpreted, amplified, and further processed. However, an alternate type of audio producing system may be substituted for amplifier 204 without departing from the scope of the present invention.

In some embodiments of the present invention, capture and transmission of the actual analog audio generated by phonograph 102's playing of record 104 allows the musical composition to be transmitted to the viewer/listener along with any supplemental audio generated due to the playing of the musical composition from record 104 (e.g., a vinyl record) including, but not limited to, audio generated by the aural imperfections present in record 104. Such aural imperfections are often referred to as audio "noise" and may include, but are not limited to, pops, snaps, and other non-musical sounds. These aural imperfections are often caused by visually-ascertainable imperfections such as, but not limited to, warped or otherwise unlevel vinyl records, marks, scratches, or smudges introduced to grooves 116. Such supplemental audio enhances the listening experience by introducing an element of the musical composition that existed in the past, prior to digital recording of musical compositions. Consequently, such supplemental audio may create a nostalgic listening experience for an older viewer/listener as well as a new type of listening experience for a younger viewer/listener. However, transmission of such supplemental audio is not required to implement the systems and methods of the present invention.

Using the method of the present invention depicted in FIG. 2, the actual audio generated by phonograph 102's playing of record 104 is the same audio that is heard by a viewer/listener. Playing of this "true" audio provides the warmth, richness, and actual sound and feel of the original vinyl recording, which was often mixed during its creation in a manner specific to vinyl records. Such warmth, richness, sound, and mixing is often lost during conversion of the musical composition to, or re-recording thereof in, a digital format. Furthermore, in one aspect of the present invention, this audio plays continuously without stopping, restarting, or being otherwise interrupted since record 104 is played progressively from its start to end. However, alternate embodiments of the present invention are envisioned in which audio play may stop, restart, or be otherwise interrupted without departing from the scope of the present invention.

The audio amplified by amplifier 204 is then transmitted to an audio/visual converter such as audio/visual converter 210. In the embodiment of the present invention depicted in FIG. 2, audio/visual converter 210 is typically located at the same location as phonograph 102, amplifier 204, and video device 208, and such location is typically a main broadcasting site such as that of a content provider (e.g., a television network, an independent broadcast station, a cable television company, a satellite television company, a World Wide Web ("Web") or Internet broadcaster, and the like). Audio/visual converter 210 interfaces between audio equipment (e.g., phonograph 102 and/or amplifier 204), video equipment (e.g., video device 208), and one or more editing devices (e.g., editing device 212).

Audio/visual converter 210 may be virtually any conventional or commercially-available device capable of mixing audio and video such as, for example, a Grass Valley Indigo AV Mixer having model no. Indigo1-SD. Audio/visual converter 210 allows the audio received from phonograph 102 via amplifier 204 to be mixed with the video received from video device 208. Audio/visual converter 210 also allows the received audio and/or video to be modified and/or controlled as necessary to optimize the viewer/listener's viewing and listening experience. For example, audio/visual converter 210 allows modification and/or control of its received audio such as additional amplification, volume control, channel control, equalization, addition of audio effects, synchronization and management of several analog and/or digital audio and video sources, mixing of audio, timing of audio, source switching, and the like as is commonly known in the art. The modified and/or mixed audio and video output from audio/visual converter 210 is then transmitted to editing device 212. In some embodiments of the present invention, amplifier 204 and audio/visual converter 210 may be a single piece of equipment.

Although FIG. 2 depicts amplifier 204 for transmission of the audio generated by phonograph 102's playing of record 104 to audio/visual converter 210, in an alternate embodiment, the audio received by amplifier 204 may be captured directly by video device 208 if such audio is of sufficient quality to be recorded or otherwise processed for transmission to its end destination (e.g., televisions 218, personal computers, etc.). In such embodiments, amplifier 204 may be omitted.

Upon receipt of the audio and video signals, editing device 212 prepares and/or conditions such signals using a software application that combines them into a digital video format that can be transferred and/or forwarded to signal distributor 216 of a content provider for distribution to the local viewing and listening devices (e.g., televisions 218, personal computers, etc.) of the content provider's subscribers. Editing device 212 may be virtually any conventional or commercially-available device capable of receiving, editing, and transmitting audio and video such as, for example, a Dell Dimension 5150 computer equipped with Sony Vegas 6.0 software. The editing functions performed by editing device 212 include, but are not limited to: audio and video non-linear editing ("NLE"); multi-track video editing on an unlimited quantity of tracks; audio recording, editing, and mixing on an unlimited quantity of tracks; video compositing; color correction; real-time playback of effects and transitions; text animation; 5.1 surround mixing; media management; high definition editing and output; and cross fading.

Once the audio and video signals received by editing device 212 have been edited to their final form, such signals are transmitted via one or more communication mediums 222 (e.g., a fiber optic line or network, wireless transmission, cable, satellite transmission, or the like) to signal distributor 216. Signal distributors 216 are typically located at one or more local broadcasting stations or hubs of the content provider. Or, in a Web/Internet type broadcasting scenario, such signal distributors may be eliminated and the signals generated by editing device 212 may be transmitted via a Web/Internet connection to one or more personal computers located at the broadcasting stations or hubs of the content provider or in a remote location (e.g., a home, business, or other private location).

Upon receipt of the audio and video signals, signal distributor 216 prepares and/or conditions such signals for transmission over a plurality of communication channels 214 to a plurality of local viewing and listening devices (e.g., televisions 218, personal computers, etc.) of the content provider's subscribers. Communication channels 214 may include, but are not limited to, fiber optic lines, wireless connections, cable lines, telephone lines, or the like). In the embodiment of the present invention in which televisions 218 receive the audio and video, signal distributor 216 may be virtually any conventional or commercially-available device capable of receiving and redistributing audio and video over a plurality of communication channels such as, for example, a Cable AML Broadband Microwave Multi-Channel Distribution System ("MMDS").

Upon receipt of such signals at televisions 218, which may be virtually any commercially available televisions such as, but not limited to, Sony FD Trinitron WEGA KV27FV300s, a viewer/listener may tune in to the desired channel upon which the signals are received such that the viewer/listener may listen to the received audio via one or more speakers 220a-220d and may continuously, or periodically, view the received video via screens 108a-108d. That is, system 200 allows a viewer/listener to hear authentic musical compositions generated by an authentic phonograph such as phonograph 102 and as generated from an original recording such as that recorded upon an authentic record 104, wherein such authentic musical compositions may or may not include supplemental audio as discussed above. In addition to hearing a true playing of an original record, the viewer/listener may additionally, optionally, view the record being played including viewing of the rotation of record 104 as well as the original artwork for the record, the position of tonearm 106, and the like. This system and/or method of viewing and listening to musical compositions allows viewers/listeners to increase their enjoyment of music by simultaneously viewing visual images that are familiar to millions of people in many older generations, that are new and different to millions of people in younger generations, that are visually non-intrusive and/or pleasing, and that are compatible with existing technology. For older viewers/listeners, this nostalgic experience takes them back to the days of listening to music before the widespread popularity of digital music in the form of compact discs, MP3 digital files, and the like. For younger viewers/listeners, this experience is completely new as many such viewers/listeners probably have never been exposed to a phonograph or original records and their associated original artwork. These experiences also provide a unique connection between younger and older viewers/listeners. In this manner, the systems and methods of the present invention provide a method of visualizing and playing musical compositions that enhances both the audible and visual aspects of the listening experience.

System 200 illustrates one system and/or method for broadcasting a visual representation and accompanying audio of an actual record being played by an actual phonograph, however, other systems may be substituted without departing from the scope of the present invention.

Alternate embodiments of the present invention are envisioned in which video only is captured from a phonograph such as phonograph 102 playing a record such as record 104. In some such embodiments, digital audio (e.g., a compact disc, an MP3 audio file, etc.) or some other non-analog form of audio is played in a fashion that correlates the timing of the play of such digital audio with the display of the captured video. That is, the play of the digital audio is timed to match the audio that would be produced if such audio were generated by phonograph 102. The digital audio may or may not include the supplemental audio discussed above.

Similarly, alternate embodiments of the present invention are envisioned in which video only is captured from a phonograph such as phonograph 102 playing a record such as record 104, and non-recorded, live audio is played in a fashion that correlates the timing of the play of such live audio with the display of the captured video, or vice versa. That is, the play of the live audio is timed to match the audio that would be produced if such audio were generated by phonograph 102, or the play of the video is timed to correlate with the timing of the live audio.

In an alternate embodiment of the present invention, signal distributor 216 and televisions 218 may be omitted and system 200 may be used to convert the audio and/or video generated by system 200 to a digital format (e.g., a software program, a screen saver, digital file, MP3 file, etc.). That is, once the audio and video signals received by editing device 212 have been edited to their final form, such signals may be saved or otherwise converted to a reusable software format. Such formats allow the digital audio and/or video to be delivered to and/or stored in any currently available or not yet invented computer and/or communication system including, but not limited to: portable audio systems (e.g., iPods, MP3 players, telephone communication systems, etc.); systems for delivery (e.g., streaming) of such audio and/or video via the Web, Internet, or the like via a live or pre-recorded broadcast; and gaming systems (e.g., video gaming systems). However, alternate systems are also envisioned for creation of such digital formats without departing from the scope of the present invention.

One such system allows a user to play or download a file including the audio and/or video received from the editing device, such as editing device 212, of a system, such as system 200, to the user's personal computer via an Internet connection or the like. In one exemplary embodiment of this type of system, signal distributor 216 and televisions 218 are omitted. Once the audio and/or video signals received by editing device 212 have been edited to their final form, a commercially available audio and/or video editing software such as, but not limited to, Sony Vegas 6.0 software, may then be used to save or otherwise convert the audio and/or video into a digital file having a widely accepted format (e.g., a Windows Media Video format, a RealVideo format, a QuickTime format, etc.). Such software may be present on editing device 212.

After the file has been saved or otherwise converted to a widely accepted format, it may be uploaded, or otherwise transferred, from editing device 212 to a Web page provided by a Web/Internet destination such as a server. The server may be owned or operated by the user, an Internet Service Provider, a Web host, or any other entity capable of hosting a Web page and/or providing access or other rights to the Web and/or Internet. The method of uploading or otherwise transferring the file may be any one of many commercially known methods including, but not limited to, via File Transfer Protocol ("FTP") software (e.g., Cute FTP, Core FTP, etc.).

Once the file has been transferred to the Web page, it may be made available to others for access and/or download. To access the file, a user simply accesses the Web page via a standard Internet browser and follows the instructions for accessing or downloading the file (e.g., clicking on a hypertext link associated with the file). If the user is accessing the file, audio/video player software (e.g., Windows Media Player, RealPlayer, QuickTime Player, etc.) compatible with the file's format and present on the user's personal computer executes the file to provide the audio and/or visual images to the user. Alternatively, the user may download the file and save it to his or her personal computer for later viewing and/or listening. Although this embodiment is described as providing the audio and/or video file in a widely accepted format to facilitate access or download of same, such files may also be provided in lesser known formats without departing from the scope of the present invention.

Figure 4:
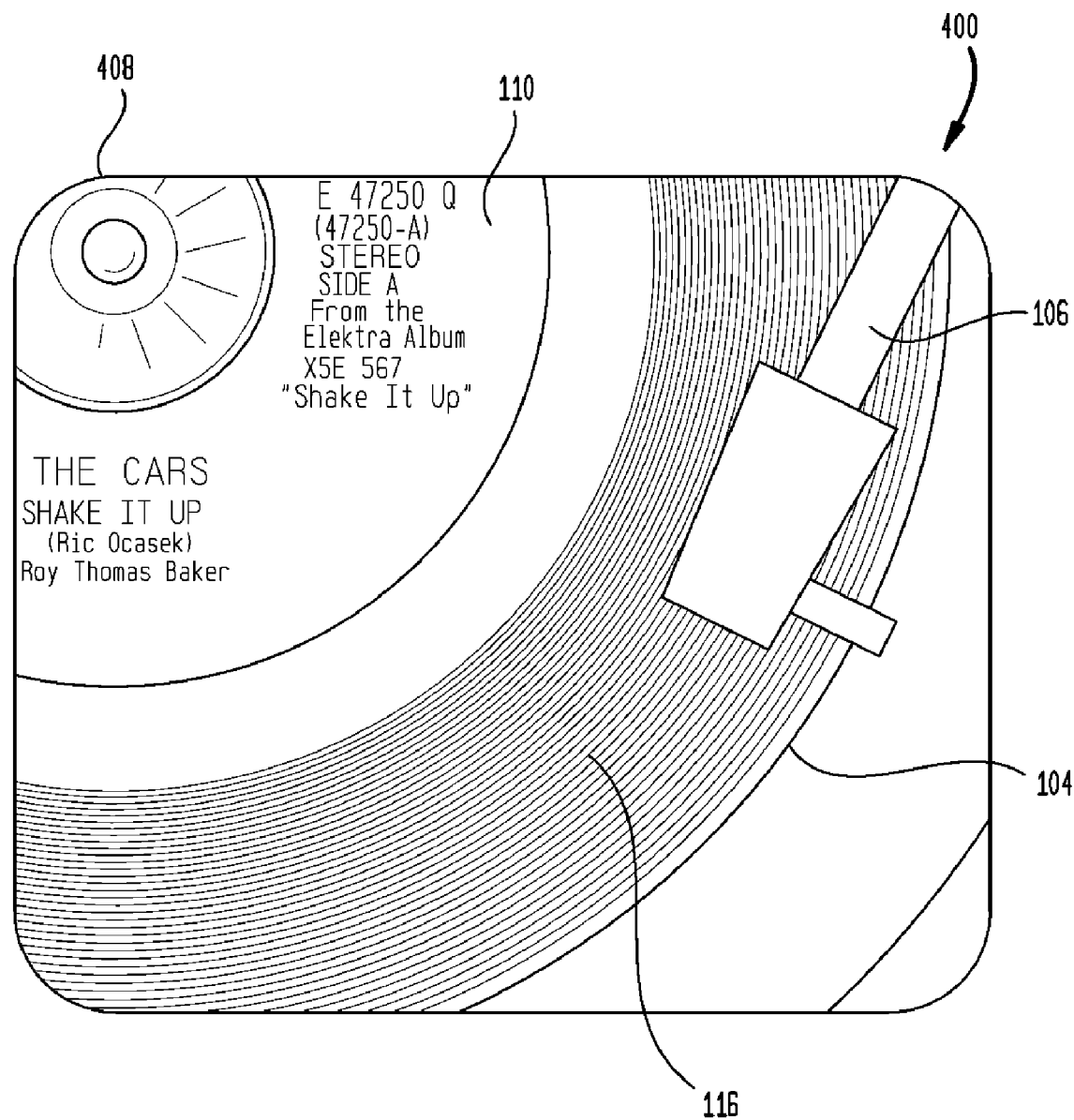
FIG. 4 depicts an alternate exemplary visual representation of a musical composition in accordance with an embodiment of the present invention including a close-up, overhead view of a portion of a record being played via a phonograph.

Turning next to FIG. 4, depicted is an alternate exemplary visual representation 400 of a musical composition in accordance with an embodiment of the present invention. Visual representation 400 includes a close-up view of the playing of record 104 via phonograph 102. This close-up view provides a close-up, more detailed view of tonearm 106 and record 104, the latter also providing close-up, more detailed views of artwork 110 and grooves 116. The detailed views of grooves 116 may include the width and spacing of such grooves. Also provided is a close-up view of the vertical up and down movement of tonearm 106 as potentially caused by the rotation of record 104 that does not have a level upper surface (i.e., the surface that is in contact with stylus 302 (FIG. 3) of tonearm 106). Such a view further provides a close-up, more detailed view of the horizontal movement of tonearm 106 as potentially caused by the rotation of record 104 having grooves 116 that are not perfectly centered. Furthermore, visual representation 400 provides a close-up view of the visual impression of the spinning record 104.

Figure 5:
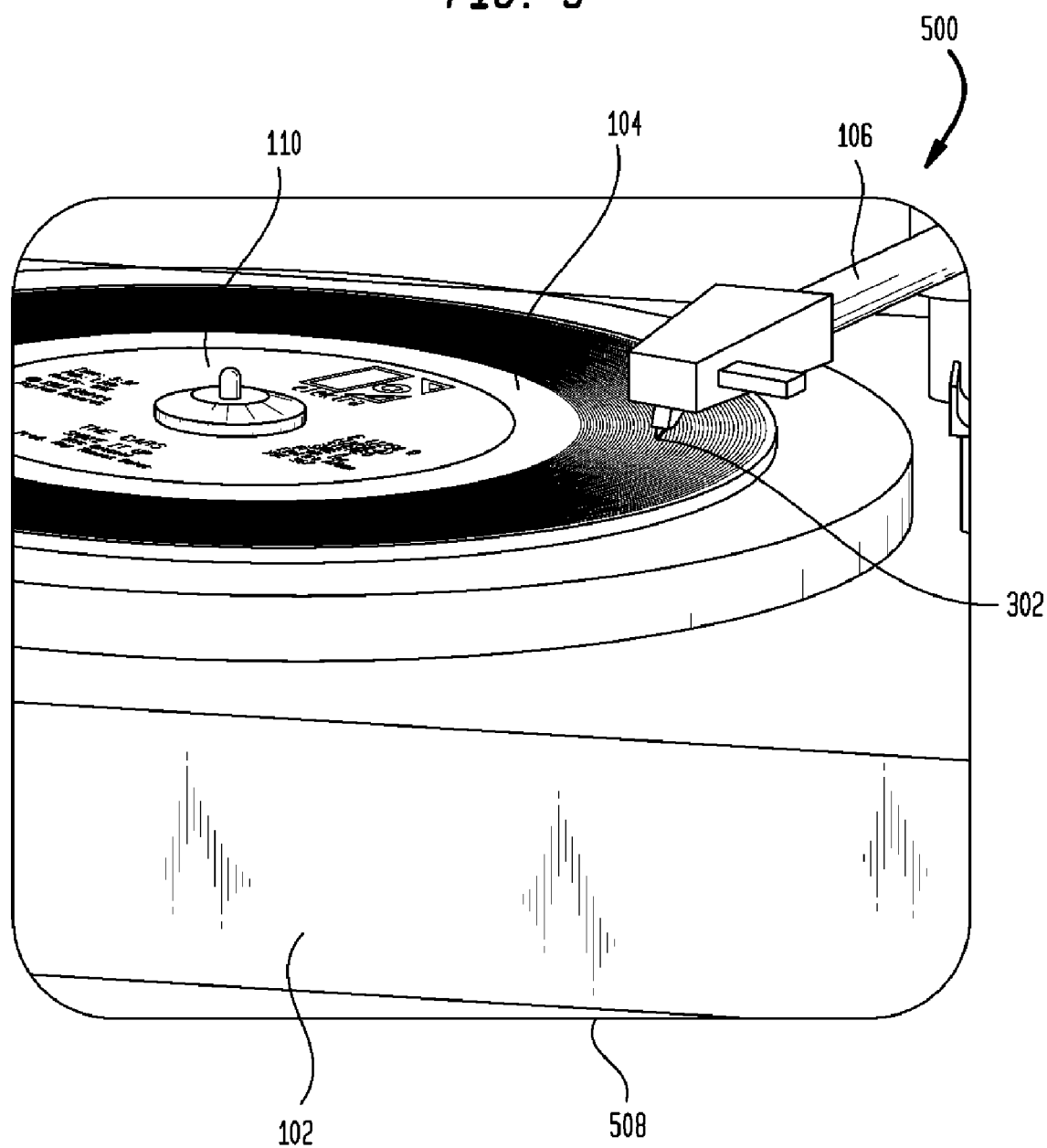
FIG. 5 depicts yet another alternate exemplary visual representation of a musical composition in accordance with an embodiment of the present invention including a close-up, partial side view and partial perspective view of a record being played via a phonograph.

Referring next to FIG. 5, depicted is an alternate exemplary visual representation 500 of a musical composition in accordance with an embodiment of the present invention. Visual representation 500 includes a close-up, partial side view of the playing of record 104 via phonograph 102. This close-up view provides a close-up, more detailed view of tonearm 106, stylus 302, and record 104. This view provides a close-up, more detailed view of the vertical up and down movement of tonearm 106 and stylus 302 as potentially caused by the rotation of record 104 that does not have a level upper surface. Such a view further provides a close-up, more detailed view of the horizontal movement of tonearm 106 and stylus 302 as potentially caused by the rotation of record 104 having grooves 116 that are not perfectly centered. Furthermore, visual representation 500 provides a close-up view of the mechanics of generating audio from record 104 via stylus 302.

Although three examples of visual representations in accordance with the present invention are depicted in FIGS. 1, 4, and 5, other visual representations may be substituted without departing from the scope of the present invention. Furthermore, when performing a method of the present invention or using a system thereof, a single visual representation may be continuously depicted or a plurality of visual representations may be provided in some form of alternating fashion to provide an enhanced viewing experience.

Although FIG. 2 depicts the transmission of audio and video generated by phonograph 102's playing of records 104 to televisions 218, systems such as system 200 may be incorporated for display of visual representations such as visual representations 100, 400, 500, and the like to live audiences gathered for the purpose of listening to, and/or viewing, live and/or recorded audio presentations. For example, such live audiences may gather for the purpose of listening to and/or viewing presentations including, but not limited to: presentations made, in whole or in part, by a disc jockey or other mobile audio provider; radio and/or television broadcasts; concerts; and films. Such live audiences may gather at events including, but not limited to, concerts, dances, weddings, and other celebrations.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of playing at least one musical composition in an audible and visual manner comprising the steps of:
   generating an audible representation of said at least one musical composition via a system, said system including:
   a phonograph;
   at least one record played via said phonograph, said playing creating audio;
   at least one video device for recording video, said at least one video device positioned to capture or record a plurality of images of at least a portion of said phonograph in said video;
   an audio/visual converter directly or indirectly coupled to said phonograph and said at least one video device, said audio/visual converter receiving said audio from said phonograph, and said audio/visual converter receiving said video from said at least one video device;
   a signal distributor coupled directly or indirectly to said audio/visual converter, said signal distributor receiving said audio and said video from said audio/visual converter; and
   at least one end device coupled directly or indirectly to said signal distributor, said at least one end device receiving said audio and said video from said signal distributor, said at least one end device displaying said audible representation; and
   generating a visual representation of said at least one musical composition via said at least one end device, said visual representation including at least one image of a record being played via a phonograph;
   wherein said visual representation includes musical composition information, said musical composition information including at least one of the group consisting of title, artist, recording label, publisher, year, record label information, sleeve information, and combinations thereof; and
   wherein a first timing of said visual representation substantially matches a second timing of said audible representation.

2. A method according to claim 1, wherein said audible representation is at least one of the group consisting of live or pre-recorded audio generated by playing said record via said phonograph, audio generated by a digital audio file, live audio, and combinations thereof.

3. A method according to claim 1, wherein said visual representation includes at least one of the group consisting of a stylus, an image, a tonearm, a tonearm rest, record label artwork, record grooves, vertical tonearm movement, horizontal tonearm movement, and combinations thereof.

4. A method according to claim 3, wherein said image is at least one of the group consisting of a sleeve image, an artist image, a record image, and combinations thereof.

5. A method according to claim 1, wherein said visual representation is displayed via said end device and said end device is a screen.

6. A method according to claim 5, wherein said screen is selected from the group consisting of a television screen, an iPod screen, a computer screen, a cell phone screen, a personal digital assistant screen, an MP3 player screen, a gaming device screen, and combinations thereof.

7. A method according to claim 1, wherein said visual representation is selected from the group consisting of a live event, a pre-recorded event, a digitally created event, and combinations thereof.

8. A method according to claim 1, wherein said audible representation includes at least one aural imperfection.

9. A method according to claim 1, wherein at least one of the group consisting of said audible representation, said visual representation, and combinations thereof are streamed to at least one computer via an Internet.

10. A method according to claim 9, wherein said streaming includes at least one of a live broadcast and a pre-recorded broadcast.

11. A method according to claim 1, wherein said record is a vinyl record.

12. A system for playing at least one musical composition in an audible and visual manner comprising:
    a phonograph;
    at least one record played via said phonograph, said playing creating audio;
    at least one video device for recording video, said at least one video device positioned to capture or record a plurality of images of at least a portion of said phonograph in said video;
    an audio/visual converter directly or indirectly coupled to said phonograph and said at least one video device, said audio/visual converter receiving said audio from said phonograph, and said audio/visual converter receiving said video from said at least one video device;
    a signal distributor coupled directly or indirectly to said audio/visual converter, said signal distributor receiving said audio and said video from said audio/visual converter; and
    at least one end device coupled directly or indirectly to said signal distributor, said at least one end device receiving said audio and said video from said signal distributor,
    wherein a first timing of said video substantially matches a second timing of said audio; and
    wherein said musical composition information includes at least one of the group consisting of title, artist, recording label, publisher, year, record label information, sleeve information, and combinations thereof.

13. A system according to claim 12, wherein said at least one video device is positioned directly overhead said phonograph.

14. A system according to claim 12, wherein said signal distributor is coupled directly or indirectly to said at least one end device through a network, said network being at least one of the group consisting of a cable television network, a satellite television network, an Internet network, and combinations thereof.

15. A system according to claim 12 further comprising:
    an amplifier coupled directly or indirectly to said phonograph and said audio/visual converter.

16. A system according to claim 12 further comprising:
    at least one editing device coupled directly or indirectly to said audio/visual converter and said signal distributor.

17. A system according to claim 12, wherein said at least one end device includes at least one of the group consisting of a television, a computer, and combinations thereof.

18. A system according to claim 12, wherein said plurality of images includes at least one of the group consisting of a stylus, musical composition information, a sleeve image, an artist image, a record image, a tonearm, a tonearm rest, record label artwork, record grooves, vertical tonearm movement, horizontal tonearm movement, and combinations thereof.

19. A system according to claim 12, wherein said audio includes at least one aural imperfection.

20. A system according to claim 12, wherein at least one of the group consisting of said video, said audio, and combinations thereof are streamed to at least one computer via an Internet.

21. A system according to claim 20, wherein said streaming includes at least one of a live broadcast and a pre-recorded broadcast.

* * * * *